Patented July 22, 1952

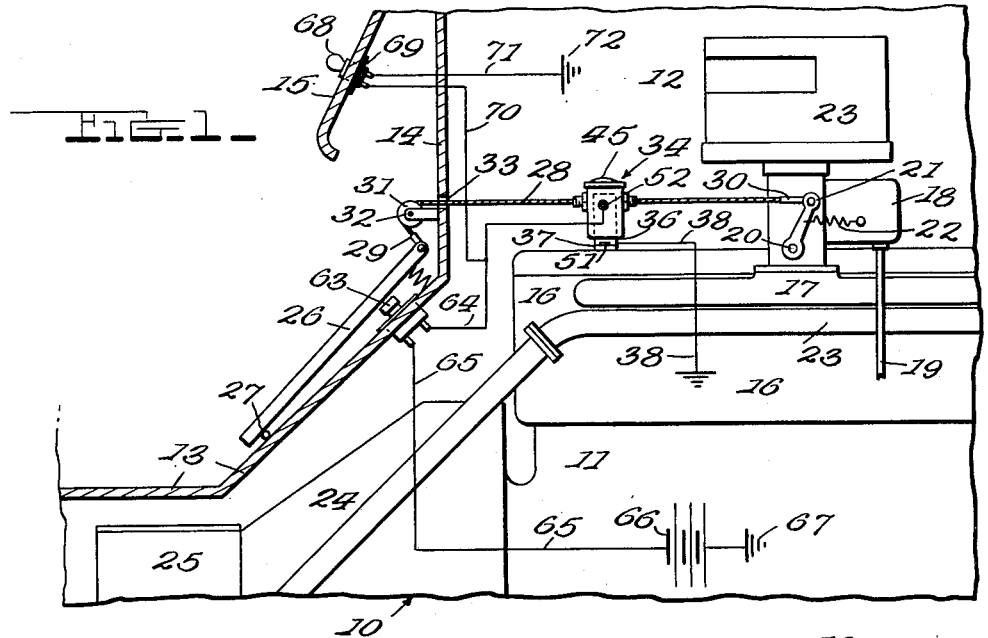

2,604,115

UNITED STATES PATENT OFFICE 2,604,115

MANUALLY OPERATED ELECTRICAL THROTTLE CONTROL

Donald J. Munson, Anderson, Ind.

Application February 9, 1950, Serial No. 143,181

2 Claims. (Cl. 137—694)

This invention relates to automobile throttle controls or accelerators for regulating the speed of the engine in propelling the auto at any selected uniform speed by controlling the gas feed or throttle valve at the throttle of the carburetor, and more particularly to a manually operated electrical throttle control employing a solenoid switch for locking the carburetor throttle control cable and throttle valve in any position or setting to which it may be moved by depressing the accelerator pedal controlling the speed of the engine and the car at the time.

An object of the invention is to provide a manually operated electrical throttle control in which a push button toe switch on the floor board of the auto or otherwise located is connected in a grounded electrical circuit with the car battery and an electro-magnetic or solenoid operated cable gripper through the movable armature plunger core of which the cable runs between and connecting the accelerator pedal to the throttle lever of the carburetor extends, so that with the throttle for feeding gas to the engine at the desired setting by depressing the pedal with the right foot and closing the toe switch and circuit to the solenoid coil winding, the latter is energized to pull inward on the core of the solenoid and grip the cable by moving a section thereof transversely or kinking the same in a tortuous position whereby the car may be kept at a uniform speed without continued pressure on the pedal or permitting variation in the acceleration due to lack of uniform pressure on the pedal or vibration thereof from travel of the car over uneven road surfaces.

Another object is to provide a simple, economical and efficient means for directly controlling the throttle feeding of the gas to the engine and regulation of the speed, which can be easily installed by hooking the same on the carburetor hand or foot control rod or cable of any gasoline, oil burning or other internal combustion motor, and which includes a signal means or light in front of the driver on the dash of the car or otherwise in circuit with the push button or other switch to the solenoid at the on or off position side thereof to indicate when the switch is closed or open, and so that when the switch is again depressed or opened, the cable will be released to a straight line position and free to move to permit the throttle lever to return to normal position to be operated freely by the accelerator foot pedal or button on the dash in the usual manner without interference.

With the above and other objects in view, as will be presently apparent, the invention consists in general of certain novel details of construction and combinations of parts hereinafter fully described, illustrated in the accompanying drawings and particularly claimed.

In the drawings, like characters of reference indicate like parts in the several views, and Figure 1 is a fragmentary sectional side elevation of a portion of an automobile with the engine in elevation, equipped with the manually operated electrical throttle control of my invention;

Figure 2 is an enlarged vertical diametrical section of the solenoid cable gripper; and Figure 3 is a horizontal section taken on the line 3—3 of Figure 2.

Referring to the drawings in detail, 10 designates a portion of an automobile at the front thereof showing the motor 11 mounted upon the chassis frame in usual manner beneath the hood 12 and in front of the floor board 13 and cowl 14 and dash 15. The motor 11 is preferably of the usual internal combustion type, gasoline, oil burning or diesel type or combustion engine of any kind having the cylinder block 16, intake manifold 17 on which is arranged a carburetor 18 with fuel feed line 19 float controlled or otherwise, and throttle valve shaft 20 having lever 21 held in normal idling position in the usual way as by a spring 22. An air filter 23 is shown mounted on the carburetor 18. Also shown, are the exhaust manifold and pipe 23, flywheel housing 24 and multi-speed transmission or gear housing 25, but it is to be understood that this showing is merely illustrative of conventional means and that any suitable transmission or drive means may be employed with hand operated or automatic shift without departing from the spirit of the invention.

Mounted upon the cowl such as at the inclined portion of the floor 13 is a throttle operating means shown as a foot pedal 26 pivoted at 27 and adapted to be operated or depressed and released to normal elevated position by the right foot of the driver in the customary manner. The free end of the pedal which may be a hand operated button, or plunger, if desired, or supplemented by the latter as is conventional on some autos, is connected to the throttle lever 21 by a connection such as flexible strand connection or cable 28 adapted to be detachably hooked on to the pedal and lever in any suitable way as by couplings or links 29 and 30 or otherwise. Cable 28 may be trained over a guide pulley 31 supported to turn in a bearing bracket 32, then extended through a hole 33 in the cowl 14 to lever 21 to connect thereto.

The cable 28 extends through a movable cable gripper 34, which is preferably electro-magnetically or solenoid operated. The gripper 34 receives the intermediate portion of the length or section of cable 28 and includes a cup or casing 35 shown cylindrical and having its closed bottom 36 spaced above, but the casing secured to the engine block 16 as by a bracket 37 bolted or otherwise fastened on the motor head to support same in an upright position and insulated from but grounded thereto by a conductor as at 38. A magnet core 39 is mounted centrally through the bottom 36 of cup 35 as by riveting at 40 and bears an eyelet sleeve 41 thereon to extend upwardly and receive a coil winding 42 held between insulating rings 43 at the top and bottom retained in position by upsetting the ends of the sleeve as at 44. The top of the cup or casing 35 is closed as by a crown cap 45 clipped or flanged over a bead or flaring mouth mouth thereof as at 46. The armature is in the form of a vertical reciprocating cylindrical plunger core 47 movable in the cylindrical sleeve 41 where it projects above magnet 39 in which it is magnetized by passing current through the coil 42 as later described.

Armature core 47 projects upwardly in casing 35 above sleeve 41 and coil 42 and is provided near the top with a diametrical bore or passage 48 through which cable connection 28 extends. The wall of cup 35 receives cable 28 therethrough at diametrically opposite points at the front and back in line with the length of cable when rectilinear. The cable is passed through open ended tubular guide sleeves 49 threaded through correspondingly related holes in the cup in horizontal alignment and held by nuts 50 threaded on opposite projecting ends of sleeves 49 against the wall of cup 35 to clamp same as seen in Figures 2 and 3.

Bracket 37 may be L-shaped with its base bolted to the engine or motor block 16 as at 51 and its leg engaging one of two terminal bolts 52 extending outwardly through diametrically opposite apertures in the casing cup 35 normal to the sleeves 49 and cable 28 as seen in Figures 1 and 3. One bolt terminal 52 may serve as a connection for ground wire 38 at bracket 37 with the bolt held in contact with the inside of casing 35 as seen at the top of Figure 3 and an insulating ring or disc bushing 53 on the outside. Nuts 54 engage one bolt 52 on opposite sides of the bracket 37 and against ring 53, with interposed lock washers 55, to clamp the bracket and fasten the bolt casing and bracket together. Wire 38 is suitably anchored to bracket 37 or bolt 52 as a binding post in electrical connection with the casing.

The other bolt 52 extends through an insulating ring bushing 53' extending into the aperture and on the outside of casing 35 and an insulating strip 56 on the bolt at the inside of the casing to insulate the bolt therefrom in electrical separation. A washer 57 and a lock washer 58 are disposed on the bolt 52 at the outside of bushing 53' and a corresponding single nut 52' is engaged on the bolt to form a binding post as will be later described. A conductor strip 59 is engaged on the bolt with insulating strip 56 and bolt head and the reduced end of the strip 59 forms a solder or other terminal connection 60 for one end of the coil 42 which extends through an opening or notch in the adjacent ring 43. The other end of the coil 42 is connected to a similar conductor strip 61 at terminal 62, the strip being mounted on one bushing 49 at the inside of cup 35 and held by the inner nut 50 thereon.

A push button or toe switch 63 is mounted through the floor board 13 for convenient operation by the left foot of the driver or otherwise located adjacent the dash or cowl, and one terminal or side thereof is connected by a wire 64 to one bolt 52 as a binding post where connected to coil 43. The other terminal or side of switch 63 is connected by a wire 65 to the car battery 66 grounded at 67 to the chassis, frame or motor. A signal means or light bulb 68, red or otherwise, is mounted in a socket 69 on the dash 15 or other convenient place where it is visible to the driver, and has one side connected by a wire 70 to wire 64, and the other side by a wire 71 to the frame, chassis or engine as at 72.

In the operation of my electro-mechanical or manually operated electrical control device, the driver depresses and closes the switch 63 at the positive side of the battery, with the left foot, to close the circuit to the electro-magnet or solenoid 34 at coil 42 and the normally raised core plunger or armature 47 supported by the cable 28 when taut due to the return of the throttle valve of the carburetor 18 to normal position will be pulled inward or downward by the magnetization of the magnet core 39 from the current flowing through the coil and attracted thereby. This will move a section of the cable 28 transversely from its normal straight or rectilinear position to an angularly bent or kinked position or loop as seen at 28' in dotted lines in Figure 2 of the drawings, to restrain, grip and lock the cable against movement and the throttle lever and valve of the carburetor at the position to which it has been moved by the depression of the accelerator pedal 26 by the right foot or other actuation of the throttle lever at any approximate setting for feeding the gas to the intake manifold and engine cylinders at the time to maintain the speed of the motor and car constant without continuing the pressure on the pedal. The cable is free to move through the tubular guides 49 for actuation of the throttle when switch 63 is open, so that upon again depressing the switch 63, the switch is released or opened, the solenoid is demagnetized by the opening of the circuit thereto and source of energy at battery 66, the armature or plunger 47 is released and moved out or up by the elevation and straightening of the cable 28 at the kink, loop or angularly bent portion 28', to permit the cable to run or work freely through the bore 48 of the armature 47 without interference with acceleration or deceleration by desired movement of the throttle by the pedal, or upon releasing pressure thereon, to freely return to normal or idling position as ordinary and normal. The device may be easily hooked on the carburetor or foot control rod or cable of any gasoline, oil burning, Diesel or combustion engine of any kind or make, may be cheaply produced and gives economical and efficient easy driving by relieving the necessity of continuing the use of the foot pedal or lever, or hand control. Also, when the switch 63 is closed and the setting held by locking the cable 28, the signal or light 68, red or otherwise, in circuit at the "on position" side, will come on to indicate the switch and throttle positions and give visible or other warning and notice to the driver of the set position so that the pressure may be taken off the foot pedal 26 and moved or rested in another or comfortable position which is very desirable in driving long distances especially on high speed highways or the like where interruption to travel at sustained or uniform constant speeds is rare as compared to city traffic.

While there is herein shown and described the preferred embodiment of the invention, it is nevertheless to be understood that minor changes may be made therein without departing from the spirit and scope of the invention as claimed.

I claim:

1. A magnetic throttle valve control mechanism comprising a casing having a throttle valve mounted therein, a flexible operating cable extending from said throttle valve, a foot pedal connected to the free end of said cable for operating the throttle valve, a solenoid housing at an intermediate point of said cable, a solenoid in said housing, means for energizing said solenoid at will, a pair of axially aligned sleeves adjustably mounted through opposed walls of said housing, a transverse bore through the solenoid armature aligned with bores of said sleeves when the solenoid is deenergized, said cable being slidably received through said bore and sleeves, said armature when energized being movable transversely of said cable to provide abrupt bends therein to restrain longitudinal movement of the cable, whereby the foot pedal can be freed from foot pressure while maintaining the throttle valve adjustment.

2. Mechanism as set forth in claim 1, characterized in that the solenoid-energizing means comprises an electric circuit having a plunger operated switch positioned near and to the left of the foot pedal.

DONALD J. MUNSON.

REFERENCES CITED

The following references are of record in the file of this patent:

UNITED STATES PATENTS

| Number | Name | Date |
| --- | --- | --- |
| 1,905,539 | White | Apr. 25, 1933 |
| 2,159,772 | Schroedter | May 23, 1939 |
| 2,236,145 | Kolb | Mar. 25, 1941 |
| 2,265,524 | Fruth | Dec. 9, 1941 |
| 2,477,865 | DuCharme | Aug. 2, 1949 |